(12) United States Patent
Wallén

(10) Patent No.: US 7,377,372 B2
(45) Date of Patent: May 27, 2008

(54) TELESCOPIC FORK LEG

(75) Inventor: Magnus Wallén, Knivsta (SE)

(73) Assignee: Öhlins Racing AB, Upplands Väsby (SE)

( * ) Notice: Subject to any disclaimer, the term of this patent is extended or adjusted under 35 U.S.C. 154(b) by 220 days.

(21) Appl. No.: 11/293,192

(22) Filed: Dec. 5, 2005

(65) Prior Publication Data

US 2006/0118374 A1    Jun. 8, 2006

(30) Foreign Application Priority Data

Dec. 6, 2004    (SE) .................................. 0402960

(51) Int. Cl.
*F16F 9/06* (2006.01)
*F16F 9/48* (2006.01)

(52) U.S. Cl. ...................... 188/312; 188/314; 188/318; 188/285

(58) Field of Classification Search ................ 188/312, 188/313, 314, 318, 319.1, 319.2, 281, 285, 188/284, 297; 280/276, 279, 284, 288
See application file for complete search history.

(56) References Cited

U.S. PATENT DOCUMENTS

| | | | | |
|---|---|---|---|---|
| 2,264,856 | A * | 12/1941 | Peppard | 188/318 |
| 2,334,115 | A * | 11/1943 | Frederick | 188/314 |
| 5,347,771 | A * | 9/1994 | Kobori et al. | 188/312 |
| 5,662,046 | A * | 9/1997 | Wright et al. | 188/312 |
| 6,454,206 | B2 * | 9/2002 | Vincent | 188/312 |
| 7,007,588 | B2 * | 3/2006 | Roy | 188/282.7 |
| 2003/0010587 | A1 | 1/2003 | Eroshenko | |

FOREIGN PATENT DOCUMENTS

| | | |
|---|---|---|
| EP | 0658466 | 6/1995 |
| EP | 1054185 | 11/2000 |
| EP | 1467118 | 10/2004 |
| JP | 60151439 | 8/1985 |
| JP | 10121775 | 5/1998 |

\* cited by examiner

*Primary Examiner*—Thomas J Williams
(74) *Attorney, Agent, or Firm*—Connolly Bove Lodge & Hutz LLP

(57) ABSTRACT

A telescopic fork leg with damping system comprising piston and piston rod arrangements. The arrangements perform longitudinal shift motions in a medium-containing chamber. The chamber is situated in a tubular part belonging to the damping system. The piston rod arrangement is designed so as in the chamber, with its parts present therein, to have substantially constant volume regardless of the shift motions. Substantial displacement creation is thereby prevented. Moreover, the medium strives to assume and maintain a particular pressure, preferably a positive pressure, on the low-pressure side of the piston arrangement. Positive pressure build-up is therefore present in the damping system and the pressure on the low-pressure side does not need to be lower than the system pressure. A valve arrangement for handling a displacement can therefore be eliminated and the telescopic fork leg can be given an advantageous and easy-to-use structure with, for example, adjustment facilities for leak flows.

18 Claims, 2 Drawing Sheets

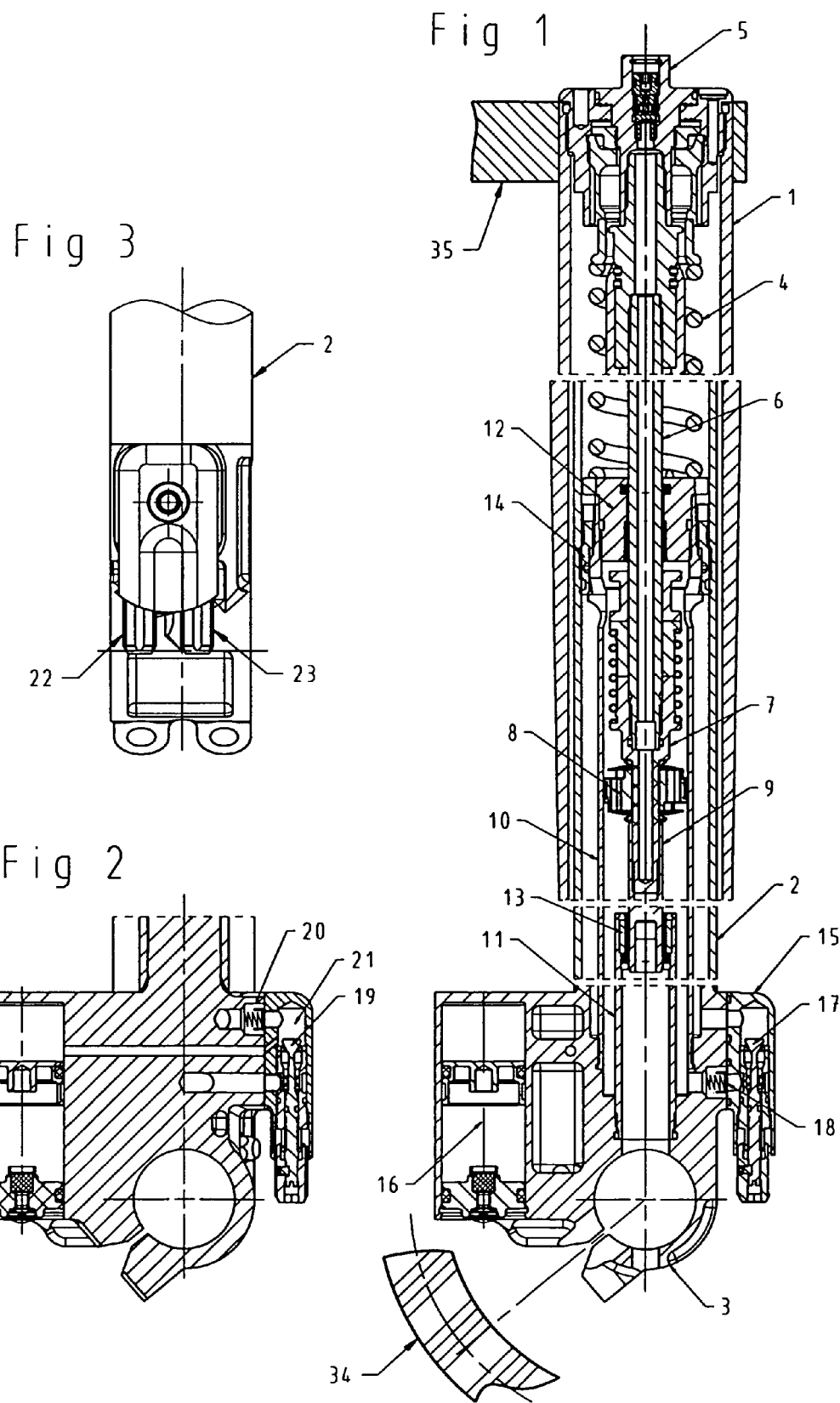

TELESCOPIC FORK LEG

Figure 4:
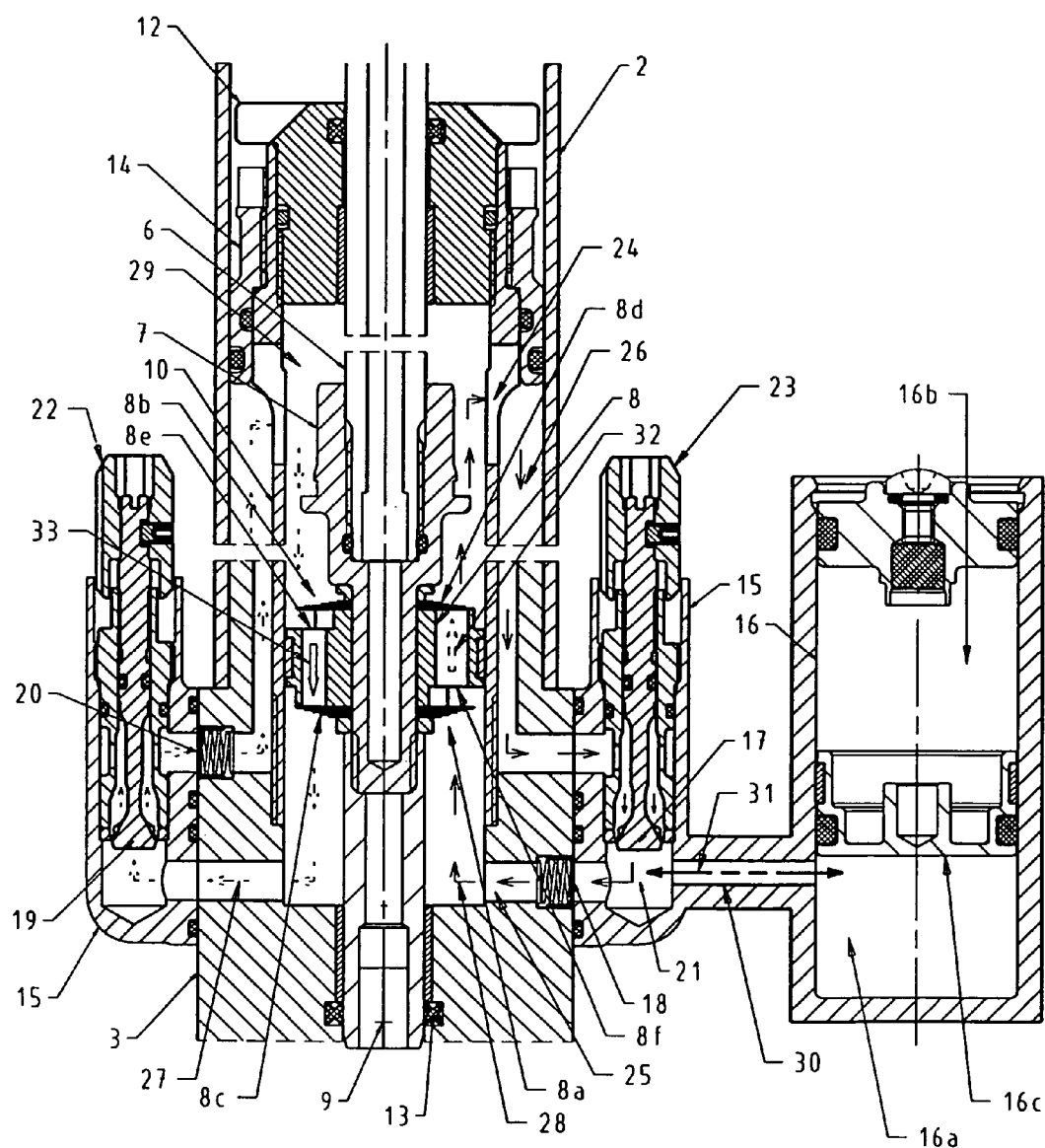

The present invention relates to a telescopic fork leg with damping system, comprising piston and piston rod arrangements designed to perform longitudinal shift motions in a chamber provided with medium, which chamber is situated in a tubular part which is divided for the damping system. The telescopic fork leg is intended to be able to form part of, for example, a front fork arrangement for, inter alia, a motor cycle.

Telescopic fork legs with damping system are previously known and, in this context, reference can be made to telescopic fork legs of this type which are sold on the open market. Reference can also be made to a telescopic fork which is sold under the designation FG 470 by the applicant for the present patent application. The known telescopic forks comprise outer and inner tubes which are mutually arranged for the telescoping function and which are fitted between mutually movable parts of the particular vehicle (for example motor cycle, car, motor scooter, etc.). The telescopic fork leg also comprises, inter alia, a main spring and fastening members and the damping system can operate with main piston, piston rod, valve arrangement, etc.

In telescopic forks of this kind, there is a need to be able to achieve improved damping characteristics and for the dynamic conditions to be able to be made more independent of the damping values in question. The telescopic fork must be able to be easily usable in connection with the particular vehicle (motor cycle) and so, for example, adjustment facilities for an integral leak flow arrangement must be eminently simple and individually configured for the compression and expansion motions in the fork. The adjustment of the leak flow in one direction shall not necessarily affect the adjustment of the leak flow in the other direction. It is also important that the respective telescopic fork leg and telescopic fork arrangement can be realized with small external dimensions or with external dimensions corresponding to those which now apply to the known telescopic forks lacking the additional functions introduced in connection with the present invention. The chamber for the telescopic fork is a critical parameter in connection with the particular vehicle. There is here a need to be able to integrate the telescoping and damping functions and to utilize the same components for these functions. It is also important to be able to reduce the number of components in the telescopic fork leg and, for example, to be able to eliminate a valve or valves which, in the prior art, is/are designed to handle the problem of an increase in medium volume due to occurring displacement. It is also important to be able to remedy cavitation problems which afflict telescopic fork legs according to the prior art. In controlling the pressure on the low-pressure side of the damping piston, there is a desire, in connection with the new telescopic fork, to be able to provide a low pressure point in the fork, which constitutes a basis for determining the change in volume which is required to adjust to varying temperatures due to temperature increase, cooling, etc. It is also advantageous to be able to provide a low-pressure point of this type which determines the pressure in the damping system. The valve arrangement (for example shims or shim assembly) for the damping piston should also be able to be assigned effective placements and must be able to be disposed wholly or partially in the main piston and/or wholly or partially beside the main piston (the damping piston).

The object of the present invention is to solve the above-stated problems in whole or in part.

The telescopic fork leg according to the invention can principally be deemed to be characterized in that the piston rod arrangement referred to in the introduction is designed so as in the chamber, with its parts present therein, to have substantially constant volume regardless of the shift motions and thereby to prevent substantial displacement creation and cause the medium to strive to assume and maintain a particular pressure, preferably a positive pressure, on the low-pressure side of the piston arrangement.

In refinements of the inventive concept, the said pressure on the said low-pressure side is substantially independent of the nature of a valve system assigned to the piston arrangement. The said pressure can here be chosen equal to the pressure of the damping system. In a preferred embodiment, the main flow of the damping system passes via damping members, for example shims, on or in the piston arrangement. Preferably adjusting members are utilized, by means of which leak flow or leak flows is/are arranged so as to be able to be conducted around the piston arrangement. Leak flow passages can here be provided for both the compression motions and the return motions of the piston arrangement. A first adjusting member can be provided for adjustability of the leak flow in respect of the compression motions and a second adjusting member can be provided for adjustability of the leak flow in respect of the return motions. Adjustment of the leak flow for the compression motions is preferably realized without affecting the leak flow for the return motions, and vice versa. The piston rod arrangement can comprise piston rod parts extending from both sides of the piston arrangement and together through the whole of the chamber in the longitudinal direction thereof, regardless of the longitudinal shift position of the piston in the chamber. Alternatively, a continuous piston rod can be arranged such that it extends in the whole of the longitudinal direction of the chamber, irrespective of the length of the respective shift motion. A piston/main piston/damping piston belonging to the piston arrangement can be applied to the said piston rod. The adjusting members are arranged so as to be easily accessible from the outside of the telescopic fork leg. The telescopic fork and damping system functions can be integrated in full or in part and the damping system is preferably provided with a low-pressure point, at which a change in medium volume due to heat or cooling is designed to occur. The invention is preferably utilized for a short-stroke and relatively long telescopic fork leg. Further embodiments of the inventive concept emerge from the following subclaims and the description.

As a result of the above-proposed, the damping system can be provided with what is here referred to as positive pressure build-up, which forms the basis for the resolution of the problems referred to in the introduction. The external dimensions of the leg can be kept down and the various main and leak flows can be easily established to produce effective damping characteristics or good damping quality.

A currently proposed embodiment of a telescopic fork leg according to the invention will be described below with simultaneous reference to the appended drawings, in which:

FIG. 1 shows in longitudinal section the structure of the telescopic fork leg,

FIG. 2 shows in longitudinal section the application of an adjusting member disposed on the telescopic fork leg according to FIG. 1, beside the adjusting member shown in connection with FIG. 1, FIG. 3 shows from the front and in basic representation the mutual positions of the adjusting members, and FIG. 4 shows in longitudinal section, in enlarged representation relative to FIG. 1, parts of the telescopic fork leg.

In FIG. 1, the outer tube of the telescopic fork leg, with associated bushings, is denoted by 1. In the outer tube there is disposed an inner tube 2, which in the present case has a double function in that it constitutes the outer tube in the below-specified damping system. The reference numeral 3 represents a bottom piece and the reference 4 represents a spring (main spring). In the present case, an adjustment 5 for spring preload is also included. A piston rod 6 is provided for the transmission of damping force to the front fork. The reference numeral 7 shows a piston holder. A main piston or damping piston is denoted by 8. In the present case, the piston is provided with continuous passages and shims or shim stacks which are placed at these and form a compression shim stack and a return shim stack. A piston rod for displacement out of the damping system is denoted by 9. The inner tube 10 of the damping system is provided with connecting ducts between the insides and the outsides in question. An extension tube 11 separates the damping system from the atmosphere. The telescopic fork leg also comprises an upper seal assembly 12, which seals between the piston rod and the inner tube of the damping system. In addition, a lower seal assembly 13 is included, which seals between the piston rod and the inner tube of the damping system. An outer seal assembly 14 seals between the inner tube of the damping system and the outer tube of the damping system. A valve housing is denoted by 15 and a gas container or accumulator by 16. Needle and mouthpiece in an adjusting member for adjusting return leak flows around the main piston are denoted by 17. In addition, a one-way valve 18 is included, arranged such that it can be opened only upon the establishment of a return leak flow around the piston 8. Needle and mouthpiece for adjusting compression leak flow around the main piston 8 are denoted by 19. A one-way valve (non-return valve) 20 can be opened only upon the establishment of a compression leak flow around the main piston.

In FIG. 2, needle and mouthpiece for an adjusting member for adjusting compression leak flow around the main piston 8 according to FIG. 1 are denoted by 19. A one-way valve which is opened only by compression leak flow around the main piston 8 is denoted by 20. A low-pressure point in which the fork is connected to the gas container 8 is represented by 21.

In FIG. 3, the mutual position between the adjusting members 22 and 23 is shown. Functions and structures for those parts or components which are not described in FIGS. 1 and 2 which do not touch upon the actual invention and which are self-descriptive in the figures can be constituted by a type which is known per se.

The damping system comprises a tubular part which forms the inner tube 10 of the damping system and which is here also referred to as the first tube. The inner tube 10 is provided with continuous (in the transverse direction) first passages. On fastening parts of the inner tube, or the bottom piece 3 of the telescopic fork leg, there are disposed one or more continuous second passages 25. A gap between the inner tube 10 and the damping system outer tube 2 (also has the function of constituting the inner tube in the telescoping function) is denoted by 26. Connections are therefore established between the two sides of the piston 8 for the leak flows 27 (dashed arrows) in respect of compression and 28 (solid arrows) in respect of expansion or return. The compression leak flow 27 therefore leads from the side 8a of the piston, the inner chamber 29 formed by the inner tube 10, the passage (duct) 27, the low-pressure point 21, the adjusting member 22, the one-way valve 20, the gap 26, the passage 24 and the chamber 29 on the other side 8b of the piston 8.

Upon return, the second leak flow path leads from the chamber 29 on the piston side 8b, the passage 24, the gap 26, the adjusting member 23, the low-pressure point 21, the one-way valve 18, the passage 25 and to the chamber 29 on the bottom side 8a of the piston. The one-way valves 18 and 20 therefore produce the leak flow connections in the respective direction and the needles and seats of the adjusting members are individually adjustable. The valves 18 and 20, in a known manner, comprise a cone, a seat and a spring, which acts in one direction. The gas container has a chamber 16a for medium, for example hydraulic oil with additives, and a chamber 16b for compressible medium, for example gas. Alternatively, the spring function with gas can be replaced with mechanical springs, etc. The separating piston is denoted by 16c. With the gas container, the pressure in the damping system is adjusted upon the changes in medium volume which occur in the event of temperature changes in connection with the surrounding environment and inner functions of the fork. The chamber 16a is connected to the low-pressure point 21 by a duct 30. Medium motions upon the said changes are indicated by arrows 31. No special valve arrangement therefore needs to be provided to handle volume changes due to temperature difference. The handling procedure is therefore valve-free (cf. prior art). The main flows through the piston 8 in both directions are symbolized with a dashed thicker arrow (compression) 32 and a solid thicker arrow (return) 33. The shim assemblies of the piston, which are denoted by 8c and 8d, determine the nature of the damping system in a manner which is known per se and are placed at continuous passages 8e and 8f in the piston. Parts of or the whole of the main flow can alternatively be conducted on the side of the piston which is here provided with additional inner tubes/ducts/gaps (not shown). The adjusting members for the leak flows are arranged such that they are easily accessible from the outside of the fork and can be actuated, for example, manually by the use of tools (screwdriver, spanner, etc.).

In the present case, a piston rod 6 is utilized which, with parts, passes fully through the chamber 29 in the longitudinal direction thereof. On the one side, the piston rod operates via a recess in the seal assembly 12. The piston rod is sealed with sealing members to prevent connection between the chamber 29 and the surroundings of the fork (the atmosphere). On the other side of the piston, the parts in question of the piston rod run in the tube 11, here referred to as the third tube (see FIG. 1). The piston rod parts in question are sealed against the inner wall of the tube 11 with sealing members which thereby seal off the damping system/the chamber 29 against the said surroundings (the atmosphere). The piston rod supports the piston 8, which is fixed in its longitudinal direction in a known manner by means of a lug and a retaining ring. The piston is provided in similarly known manner with a sliding-seal member, which is interactable with the inner face of the tube 10. The total length of the longitudinal shift motion is determined with interaction between stop parts on the piston rod arrangement and inner faces on the assembly 12 and the bottom piece 3. The piston rod is composed of piston rod parts mutually connected in a known manner. The external dimensions of the piston rod are chosen such that they substantially match on both sides of the piston in order to avoid displacement effect when the piston is shifted in the chamber 29. The parts which respectively enter and leave the chamber during compression and return shall correspond in terms of volume to the outgoing and ingoing parts of the piston rod in the shift motions, so that volume change is prevented for the medium. The arrangement means that the pressure on the low-pressure side is positively maintained and that, for example, cavitation problems do not arise. Very rapid shift motions can give rise to instantaneous lowering of the said pressure, but the arrangement constantly strives to rapidly return to and maintain the desired positive pressure on the low-pressure side. The telescopic fork is intended to be fastened to two mutually movable parts on a particular vehicle. In FIG. 1, a first part in the form of a wheel is symbolized with 34 and a second part in the form of a chassis is symbolized with 35. The fastening to the parts can be realized in a known manner. The main piston can alternatively be provided with two or more piston rod parts, which project from both sides of the piston. In the present example, the inner tube of the telescoping function is also utilized as an outer tube in the damping function and is therefore included on the one hand as a strength-determining element, on the other hand as a medium-flow-determining element. In the present case, the fork represents a relatively long fork, for example a fork of 0.5-1.0 m length, which operates with relatively short strokes, for example 0.2-0.4 m stroke length, the lower and higher values respectively of the length ranges being interdependent. One or more pistons 16 can be included. The gas container is integrated in the said bottom piece, in which the said low-pressure point is also placed. The adjusting members are disposed on the bottom piece.

The invention is not limited to the embodiments shown above by way of example, but may be modified within the scope of the following patent claims and the inventive concept.

The invention claimed is:

1. A telescopic fork leg with a damping system, comprising:
    a piston having a low-pressure side;
    a chamber provided with a medium situated in a first tube of the damping system;
    one or more piston rod arrangements, designed to perform longitudinal shift motions in said chamber, comprising:
        a piston rod part, configured to extend from said first tube;
        a second tube situated inside the first tube, at a first end of the first tube, and
    against whose inner face the piston rod part is sealed against the chamber;
    and a third tube having the first tube disposed therein via an intervening gap,
    wherein the first tube is provided with one or more medium passages on both sides of the piston rod arrangement, wherein the second tube is designed to seal off the damping system from the surrounding atmosphere, and wherein the piston rod arrangement is configured to maintain substantially constant volume regardless of the shift motions and thereby to prevent substantial displacement of the medium and to cause the medium to strive to assume and maintain a particular pressure on the low-pressure side of the one or more piston arrangements.

2. A telescopic fork leg according to claim 1, wherein said pressure on the low-pressure side is substantially independent of the nature of a valve system assigned to the piston arrangement.

3. A telescopic fork leg according to claim 1, wherein said pressure on the low-pressure side is at least as high as the pressure of the damping system.

4. A telescopic fork leg according to claim 1, wherein the main flow of the damping system passes via damping members on or in the piston arrangement.

5. A telescopic fork leg according to claim 1, wherein leak flow(s) adjustable by means of adjusting member is/are arranged so as to be able to be conducted around the piston arrangement.

6. A telescopic fork leg according to claim 5, wherein leak flow passages are provided for both the compression motions and the return motions of the piston arrangement.

7. A telescopic fork leg according to claim 6, wherein a first adjusting member is provided for adjustability of the leak flow in respect of the compression motions and a second adjusting member is provided for adjustability of the leak flow in respect of the return motions, and wherein the adjusting members are arranged to allow adjustment of the leak flow for the compression motions without affecting the leak flow for the return motions, and vice versa.

8. A telescopic fork leg according to claim 1, wherein the piston rod arrangement comprises piston rod parts extending from both sides of the piston arrangement and together through the whole of the chamber in the longitudinal direction thereof.

9. A telescopic fork leg according to claim 1, wherein the piston rod arrangement comprises or consists of a continuous piston rod extending through the chamber in the longitudinal direction thereof and to which a main piston belonging to the piston arrangement is applied.

10. A telescopic fork leg according to claim 7, wherein the adjusting members are arranged so as to be easily accessible from the outside of the telescopic fork leg.

11. A telescopic fork leg according to claim 1, wherein a part of the structure of the telescopic fork leg forms part or parts of the damping system.

12. A telescopic fork leg according to claim 1, wherein the damping system includes a low-pressure point, and wherein a compensation or reduction of medium volume due to heat and cooling-down respectively is designed to take place via the low-pressure point.

13. A telescopic fork leg according to claim 1, wherein the telescopic fork leg consists of a short-stroke and relatively long telescopic fork leg.

14. A telescopic fork leg according to claim 1, further comprising:
    one or more adjustable leak flows configured to be conducted around the piston arrangement;
    one or more leak flow passages configured for both compression and return motions of the piston arrangement; and
    a first adjusting member configured to adjust said leak flow in respect of the compression motions and a second adjusting member configured to adjust said leak flow in respect of the return motions,
    wherein the adjusting members are arranged to allow adjustment of the leak flow for the compression motions without affecting the leak flow for the return motions, wherein the adjusting members for the compression and return motions are disposed outside the third tube, and further wherein the leak flows for the compression motions and the return motions lead via connections formed by the passages, the gap and the adjusting members, and in which one or more one-way valves are disposed.

15. A telescopic fork leg according to claim 14, further comprising:
    a low-pressure point in which a compensation or reduction of medium volume, due to heating followed by cooling, is designed to take place via the low-pressure point;
    an accumulator having a separating piston for a spring suspension chamber and
a medium chamber connected to the low-pressure point situated between the adjusting members and the one-way valves.

16. A telescopic fork leg according to claim 1, wherein the third tube forms an inner tube to provide a connection-forming function in the telescoping function of the leg, and wherein, by virtue of said connection-forming function, the third tube is assigned tasks in both the telescoping and the damping functions.

17. A telescopic fork leg according to claim 1, wherein the particular pressure on the low-pressure side of the piston arrangement is a positive pressure.

18. A telescopic fork leg comprising
an outer and an inner tube,
a damping system comprising an inner tube and an outer tube common with the inner tube, and comprising
a piston disposed in a chamber, the chamber having a present therein, situated in the inner tube of the damping system, and
an accumulator configured to pressurize the medium, the main flow of the medium leading through and/or the side of the piston, wherein the piston is applied to or provided with one or more piston rod parts, comprising
a piston rod, which pass through the chamber and which, on both sides of the piston, having substantially equally large external dimensions and thereby is configured to prevent the creation of a displacement effect upon the motions of the piston in the chamber;

and a third tube having the inner tube disposed therein via an intervening gap, wherein the inner tube is provided with one or more medium passages on both sides of the piston rod arrangement, wherein the outer tube is designed to seal off the damping system from the surrounding atmosphere, and leak flow leads between a top and bottom sides of the piston into a gap between the inner tube of the damping system and the common tube and via one or more one-way valves; and the accumulator, with its medium-pressurizing chamber, is connected to the gap via a low-pressure point which in configured to determine the pressure of the damping system and is further configured to maintain the pressure of the damping system on the low-pressure side of the piston.

* * * * *